Figure 1:
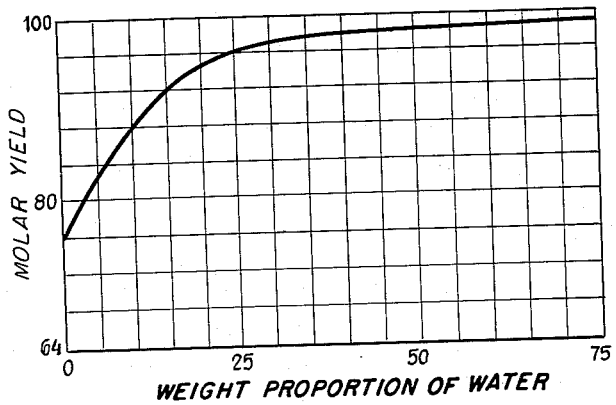

July 5, 1966   J. MERCIER ET AL   3,259,658
PREPARATION OF UNSATURATED CARBONYL COMPOUNDS
Filed May 9, 1962

INVENTORS
JULES MERCIER.
ALBERT BOUNIOT.
BY
Ward, Neal, Haselton, Orme & McClannon
ATTORNEYS.

United States Patent Office 3,259,658
Patented July 5, 1966

3,259,658
PREPARATION OF UNSATURATED CARBONYL COMPOUNDS
Jules Mercier and Albert Bouniot, Melle, Deux-Sevres, France, assignors to Les Usines de Melle (societe anonyme), Melle, Deux-Sevres, France
Filed May 9, 1962, Ser. No. 193,410
Claims priority, application France, May 19, 1961, 862,337
9 Claims. (Cl. 260—596)

This invention is concerned with the production of olefinic carbonyl compounds.

An object of the invention is to prepare unsaturated aldehydes and ketones from the corresponding beta-hydroxy compounds by a dehydration reaction which provides both high yields and high conversion rates.

Another object of the invention is to effect the principal reaction while avoiding substantially decreased yields which have been heretofore encountered due to undesirable polymerization or to decomposition of both reactants and products.

These and other objects will be apparent from the following description of the novel features of this invention.

It is known that olefinic carbonyl compounds (olefinic aldehydes and ketones) can be produced by dehydrating the corresponding hydroxy carbonyl compounds (aldol or ketol) in the presence of a strong inorganic acid such as sulfuric acid or phosphoric acid or else in the presence of an ion exchange resin of the sulfonic acid type, employed in its "hydrogen" form, as a catalyst.

Besides the desired carbonyl compound (more especially in the case of an olefinic ketone) there are formed material amounts of high molecular weight by-products and a substantial proportion of saturated carbonyl compound with a lesser number of carbon atoms in the molecule, resulting from decomposition of the starting hydroxy carbonyl compound.

We have found in accordance with our invention a process for the preparation of unsaturated carbonyl compounds by contacting an aliphatic hydroxy carbonyl compound with a cation exchange carboxylic resin in the hydrogen form in the presence of a substantial quantity of water. The process operates with a very reduced formation of high molecular weight by-products. The yields obtained in accordance with our process may be as high as 99.5% or even higher.

It has also been found that carrying out the reaction in the presence of a substantial proportion of water results in a substantial increase of the speed of the dehydration reaction of the hydroxy carbonyl compound, even though water is produced by the reaction.

Moreover, the presence of initially added water favorably results in considerably reducing the speed of the decomposition reaction of the hydroxy carbonyl compound into saturated carbonyl compound of lower molecular weight.

As above indicated, the catalyst employed in accordance with this invention is a cation exchange resin having carboxylic acid groups attached to an organic resin base, for example, resin Amberlite I.R.C. 50 from Rohm & Haas Company, which is a carboxylic phenol resin. Many other carboxylic ion exchange resins are known and those are applicable to the process of the invention.

Such catalysts are chemically inert towards low molecular weight, saturated carbonyl compounds, especially towards acetone, whether in the cold or in the hot, in the temperature range hereinafter indicated as suitable for carrying out the invention, and this fact constitutes a substantial advantage as compared with the use of a sulfonic resin which, in the presence of acetone even cold, gives rise, after several hours' contact, to formation of acetone condensation products which impart a strong, yellow-brown color to the liquid mixture.

Moreover, in addition to the general advantages inherent to any solid catalyst (viz., easy separation of the catalyst from the reaction mixture at the end of the operation, possibility of working in a neutral, non-corrosive medium), such carboxylic type resins can be satisfactorily employed at temperatures as high as 160° C.

The high resistance of the carboxylic resins to the hot reactants allows advantageous operating conditions to be used which make possible a high reaction rate.

The reactor need not be made of corrosion-resistant materials. There may be used, for example, ordinary steel.

For carrying out the reaction continuously, one may pass through a bed of the resin catalyst a liquid mixture containing the hydroxy carbonyl compound and water, said liquid mixture being previously brought to suitable temperature.

It is especially advantageous to operate in a reactor of the type described in United States Patent 2,980,731.

The proportion of water should amount to at least 20% by weight of the initial liquid mixture to reduce the speed of decomposition of the hydroxy carbonyl compound into low molecular weight, saturated carbonyl compound.

However, too great an excess of water finally reduces the speed of conversion of the hydroxy carbonyl compound into the corresponding olefinic carbonyl compound. Accordingly, it is advisable to operate with a water proportion of 20–50% by weight, preferably 30–50% by weight, in the initial liquid mixture.

Figure 3:
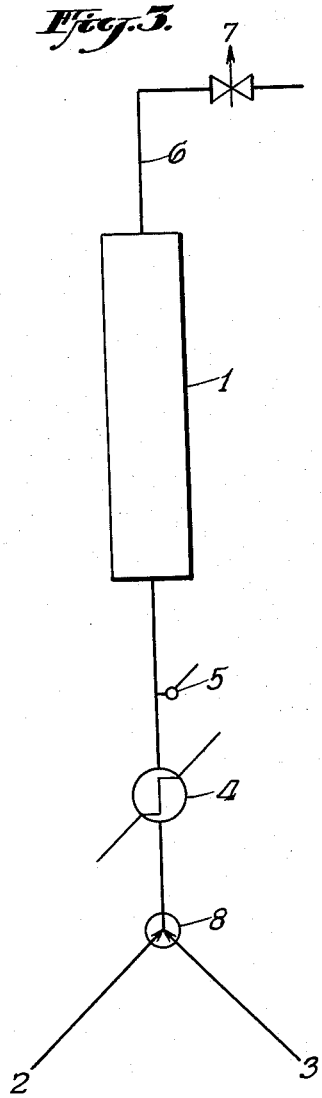
Figure 2:
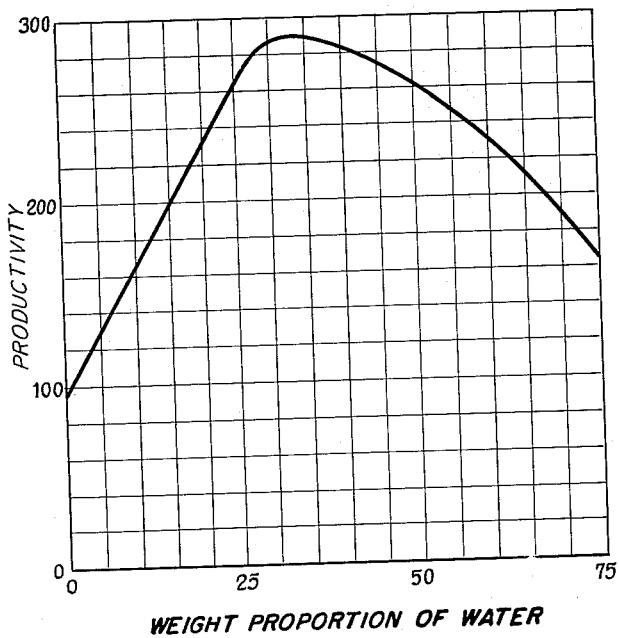

The above is illustrated in the accompanying drawings forming part of this application in which FIG. 1 represents the molar yield obtained upon dehydration of diacetone alcohol at a temperature of 125° C. to produce mesityl oxide, FIG. 2 represents the production rate of mesityl oxide in accordance with the same reaction, and FIG. 3 is a schematic drawing illustrating one type of apparatus applicable to the process of this invention.

In FIGS. 1 and 2, the weight proportion of water in the initial liquid mixture is represented in the abscissa; in the ordinate is represented the molar yield (i.e., the ratio, mesityl oxide/mesityl oxide+acetone) in FIG. 1 and the productivity (i.e., the number of grams of mesityl oxide produced per liter of catalyst and per hour) at 125° C. in FIG. 2. The curves clearly show the influence of the water proportion in the initial mixture, respectively upon the decomposition reaction of diacetone alcohol into acetone and upon the productivity of the apparatus.

The contact time, defined as being the ratio of the volume of catalyst (measured in quiet state, lying under the starting liquid mixture) to the hourly feed of starting liquid mixture, may vary from 20 to 120 minutes and is preferably of the order of 60 minutes.

The reaction temperature is preferably of from 100 to 160° C.

The pressure maintained will depend upon the chosen temperature and is higher than the vapor pressure of the reaction mixture at said temperature, for maintaining said reaction mixture in the liquid state. Generally the pressure range is of from 2 to 17 kg. per cm.$^2$, absolute pressure.

The present invention is particularly advantageous to the case of diacetone alcohol dehydration, but may also be successfully applied to the dehydration of ketols in general, for example ketols resulting from condensation of acetone with methyl ethyl ketone, acetaldehyde or butyraldehyde. The carboxylic resin used as a catalyst is chemically inert towards acetone as well as towards methyl ethyl ketone, acetaldehyde, butyraldehyde, and the like.

The invention may also be successfully applied to the dehydration of aldols, for example, the conversion of acetaldol into crotonaldehyde. The carboxylic resin does not react with acetaldehyde, whether the latter is already present in free state in the mixture or is present therein in the form of a combination with aldol, such as the acetaldol-acetaldehyde complex compound which is formed by the condensation reaction and is destroyed only at high temperature, about 120° C.

*Example 1*

The operation described in this example was carried out in the apparatus of FIG. 3.

To reactor 1, filled with 500 liters of the carboxylic resin I.R.C. 50 in its hydrogen form measured in a quiet state lying under a layer of liquid aqueous diacetone alcohol, there was fed continuously per hour:

350 kg. of diacetone alcohol by pipe 2, and
150 kg. of water by pipe 3.

The mixture of diacetone alcohol and water was introduced into reactor 1 through pipe 5 by means of pump 8 (discharging the liquid under a pressure of 4 kg./cm.$^2$), after being heated to 135° C. in heat exchanger 4.

At the exit from the reactor, the reaction mixture, which separates by itself from the catalyst bed, was sent by pipe 6 to a separation unit (not shown), after release by passage through valve 7. The reaction mixture had the following composition:

| | Kg. |
|---|---|
| Mesityl oxide | 140 |
| Water | 176.3 |
| Diacetone alcohol | 181.2 |
| Acetone | 2.1 |
| High boiling products | 0.4 |

The diacetone alcohol conversion into mesityl oxide was:

$$\frac{140 \times \frac{116}{98}}{350} = 47.3\%$$

The conversion into acetone was:

$$\frac{2.1}{350} = 0.6\%$$

The conversion into high boiling products was:

$$\frac{0.4}{350} = 0.1\%$$

The mesityl oxide yield was:

$$\frac{\text{Mesityl oxide}}{\text{Mesityl oxide} + \text{high boiling products}} = \frac{47.3}{47.4} = 99.8\%$$

The rate of decomposition into acetone was only:

$$\frac{\text{Acetone}}{\text{Acetone} + \text{Mesityl oxide}} = 1.25\%$$

*Example 2*

In order to illustrate the influence of water upon the reaction, the operation of Example 1 was repeated, except that diacetone alcohol alone, without water, was fed to the reactor.

The same reactor as in Example 1 was used, filled with 500 liters of the same catalyst. Into this reactor there was introduced continuously, per hour, 500 kg. of diacetone alcohol previously heated at 135° C. in heat exchanger 4.

The final reaction mixture had the following composition:

| | Kg. |
|---|---|
| Mesityl oxide | 45 |
| Water | 5.3 |
| Diacetone alcohol | 431.9 |
| Acetone | 17.7 |
| High boiling products | 0.1 |

Conversion into mesityl oxide:

$$\frac{45 \times \frac{116}{98}}{500} = 10.65\%$$

Conversion into acetone:

$$\frac{17.7}{500} = 3.54\%$$

Conversion into high boiling products:

$$\frac{0.1}{500} = 0.2\%$$

Mesityl oxide yield:

$$\frac{\text{Mesityl oxide}}{\text{Mesityl oxide} + \text{high boiling products}} = \frac{10.65}{10.67} = 99.8\%$$

Rate of decomposition into acetone:

$$\frac{\text{Acetone}}{\text{Acetone} + \text{mesityl oxide}} = \frac{3.54}{14.19} = 24.9\%$$

*Example 3*

This example illustrates acetaldol dehydration into crotonaldehyde.

To a reactor similar to that of Example 1 and filled with 300 liters of the same resin catalyst, there was fed continuously, per hour, 300 kg. of a mixture having the following composition:

| | Kg. |
|---|---|
| Acetaldol | 140 |
| Acetaldehyde (both in free state and in combined state in the form of complex compounds of the aldoxan type) | 60 |
| Water | 100 |

The reactor was maintained under a pressure of 7 kg./cm.$^2$ to allow the reaction to take place at a temperature as low as 126° C.

The composition of the final reaction mixture, given below, illustrates the high conversion rate of the acetaldol and the high crotonaldehyde yield:

| | Kg. |
|---|---|
| Crotonaldehyde | 97 |
| Water | 124.5 |
| Acetaldol | 18 |
| Acetaldehyde | 60 |
| High boiling products | 0.5 |

Conversion into crotonaldehyde:

$$\frac{97 \times \frac{88}{70}}{140} = 87.1\%$$

Conversion into high boiling products:

$$\frac{0.5}{140} = 0.35\%$$

Crotonaldehyde yield:

$$\frac{\text{Crotonaldehyde}}{\text{Crotonaldehyde} + \text{high boiling products}} = 99.6\%$$

The process of the invention may be successfully used for the catalytic dehydration of other hydroxy carbonyl compounds. For example, the pentan-2-ol-4-one produced by condensing acetaldehyde with acetone gives by dehydration in accordance with our process pent-2-en-4-one.

*Example 4*

To a reactor similar to that of Example 1 and filled with 300 liters of an active cation exchange carboxylic resin of the polyphenylacrylic type, there was fed continuously, per hour, 436 kg. of a mixture having the following composition:

| | Kg. |
|---|---|
| Diacetone alcohol | 218 |
| Water | 218 |

The reactor was maintained under a pressure of 6 kg./cm.$^2$ to allow the reaction to take place in liquid phase at 148° C.

The composition of the final reaction mixture was as follows:

| | Kg. |
|---|---|
| Mesityl oxide | 129 |
| Water | 242 |
| Diacetone alcohol | 54.7 |
| Acetone | 10 |
| High boiling products | 0.3 |

Conversion into mesityl oxide:

$$\frac{129 \times \frac{116}{98}}{218} = 70\%$$

Conversion into acetone:

$$\frac{10}{218} = 4.57\%$$

Conversion into high boiling products:

$$\frac{0.3}{218} = 0.14\%$$

Mesityl oxide yield:

$$\frac{70}{70.14} = 99.8\%$$

Rate of decomposition into acetone:

$$\frac{4.57}{74.57} = 6.15\%$$

*Example 5*

This example illustrates dehyration of heptan-4-ol-2-one (produced by condensing butyraldehyde with acetone) into hept-3-en-2-one.

To a reactor similar to that of Example 1 and filled with 300 liters of the same resin catalyst as in Example 4, there was fed continuously, per hour, 350 kg. of a mixture having the following composition:

| | Kg. |
|---|---|
| Heptan-4-ol-2-one | 175 |
| Water | 175 |

The reactor was maintained at a pressure of 4 kg./cm.$^2$ and a temperature of 136° C.

The composition of the final reaction mixture was as follows:

| | Kg. |
|---|---|
| Hept-3-en-2-one | 90 |
| Water | 188 |
| Heptan-4-ol-2-one | 64.7 |
| Butyraldehyde | 3.5 |
| Acetone | 2.8 |
| High boiling products | 1 |

Conversion into hept-3-en-2-one:

$$\frac{90 \times \frac{130}{112}}{175} = 60\%$$

Conversion into acetone and butyraldehyde:

$$\frac{2.8 \times \frac{130}{58}}{175} = 3.6\%$$

Conversion into high boiling products:

$$\frac{1}{175} = 0.57\%$$

Hept-3-en-2-one yield:

$$\frac{60}{60.57} = 99.06\%$$

Rate of decomposition into acetone and butyraldehyde:

$$\frac{3.6}{63.6} = 5.65\%$$

What is claimed is:

1. A process which comprises contacting a liquid mixture containing an aliphatic hydroxy carbonyl compound containing up to seven carbon atoms together with at least 20% by weight of water based on the initial weight of the liquid mixture with a cation exchange carboxylic acid resin in its hydrogen form at a temperature of from about 100° C. to about 160° C. to produce the corresponding olefinic carbonyl compound.

2. A process which comprises heating a mixture containing an aliphatic hydroxy carbonyl compound containing up to seven carbon atoms together with at least 20% by weight of water based on the initial weight of the liquid mixture with a cation exchange carboxylic acid resin in its hydrogen form at a temperature of from about 100° C. to about 160° C. to produce the corresponding olefinic carbonyl compound.

3. A process for the production of olefinic carbonyl compounds by dehydration of the corresponding hydroxy carbonyl compound containing up to seven carbon atoms which comprises contacting a mixture containing said hydroxy carbonyl compound together with at least 20% by weight of water based on the initial weight of the liquid mixture with a cation exchange carboxylic acid resin in the hydrogen form at a temperature of from about 100° C. to about 160° C. for a contact time of from about 20 to about 120 minutes at an external pressure higher than the vapor pressure of the reaction mixture.

4. A process for the production of olefinic carbonyl compounds by dehydration of the corresponding hydroxy carbonyl compound containing up to seven carbon atoms which comprises contacting a mixture containing said hydroxy carbonyl compound together with at least 20% by weight of water based on the initial weight of the liquid mixture with a cation exchange carboxylic acid resin in the hydrogen form at a temperature of from about 100° C. to about 160° C. for a contact time of from about 20 to about 120 minutes at an external vapor pressure of from about 2 to about 17 kilograms per square centimeter.

5. A process for the production of olefinic carbonyl compounds by dehydration of the corresponding hydroxy carbonyl compound containing up to seven carbon atoms which comprises contacting a mixture containing said hydroxy carbonyl compound together with about 30% to about 50% by weight of water based on the initial weight of the liquid mixture with a cation exchange carboxylic acid resin in the hydrogen form at a temperature of from about 100° C. to about 160° C. for a contact time of from about 20 to about 120 minutes at an external vapor pressure of from about 2 to about 17 kilograms per square centimeter.

6. A process for the production of mesityl oxide by dehydration of diacetone alcohol which comprises contacting a mixture containing said hydroxy carbonyl compound together with about 30% to about 50% by weight of water based on the initial weight of the liquid mixture with a cation exchange carboxylic acid resin in the hydrogen form at a temperature of from about 100° C. to about 160° C. for a contact time of from about 20 to about 120 minutes at an external vapor pressure of from about 2 to about 17 kilograms per square centimeter.

7. A process for the production of crotonaldehyde by dehydration of acetaldol which comprises contacting a mixture containing said hydroxy carbonyl compound together with about 30% to about 50% by weight of water based on the initial weight of the liquid mixture with a cation exchange carboxylic acid resin in the hydrogen form at a temperature of from about 100° C. to about 160° C. for a contact time of from about 20 to about 120 minutes at an external vapor pressure of from about 2 to about 17 kilograms per square centimeter.

8. A process for the production of hept-3-en-2-one by dehydration of heptan-4-ol-2-one which comprises contacting a mixture containing said hydroxy carbonyl compound together with about 30% to about 50% by weight of water based on the initial weight of the liquid mixture with a cation exchange carboxylic acid resin in the hydrogen form at a temperature of from about 100° C. to about 160° C. for a contact time of from about 20 to about 120 minutes at an external vapor pressure of from about 2 to about 17 kilograms per square centimeter.

9. A process for the production of pent-2-en-4-one by dehydration of pentan-2-ol-4-one which comprises contacting a mixture containing said hydroxy carbonyl compound together with about 30% to about 50% by weight of water based on the initial weight of the liquid mixture with a cation exchange carboxylic acid resin in the hydrogen form at a temperature of from about 100° C. to about 160° C. for a contact time of from about 20 to about 120 minutes at an external vapor pressure of from about 2 to about 17 kilograms per square centimeter.

References Cited by the Examiner

UNITED STATES PATENTS

| | | | |
|---|---|---|---|
| 2,312,751 | 3/1942 | Cohen | 260—596 |
| 2,341,229 | 2/1944 | Mueller-Cunradi et al. | 260—603 |
| 2,794,837 | 6/1957 | Gimme et al. | 260—596 |
| 2,980,731 | 4/1961 | Alheritiere et al. | 260—488 |
| 3,045,048 | 7/1962 | Maisel et al. | 260—596 |

OTHER REFERENCES

Calmon et al., Ion Exchangers in Organic and Biochemistry, pp. 681–2 (1957).

Richter, Textbook of Organic Chemistry, page 116 (1952 edition), John Wiley and Sons, Inc.

LEON ZITVER, *Primary Examiner.*

L. WEINBERGER, W. B. LONE, *Assistant Examiner.*